United States Patent [19]

Volkert et al.

[11] Patent Number: 5,187,206

[45] Date of Patent: Feb. 16, 1993

[54] PRODUCTION OF CELLULAR PLASTICS BY THE POLYISOCYANATE POLYADDITION PROCESS, AND LOW-BOILING, FLUORINATED OR PERFLUORINATED, TERTIARY ALKYLAMINES AS BLOWING AGENT-CONTAINING EMULSIONS FOR THIS PURPOSE

[75] Inventors: Otto Volkert, Weisenheim; Walter Maurer, Mutterstadt, both of Fed. Rep. of Germany

[73] Assignee: BASF Aktiengesellschaft, Ludwigshafen, Fed. Rep. of Germany

[21] Appl. No.: 892,874

[22] Filed: Jun. 3, 1992

[30] Foreign Application Priority Data

Jun. 13, 1991 [DE] Fed. Rep. of Germany ....... 4119459

[51] Int. Cl.⁵ .............................................. C08J 9/14
[52] U.S. Cl. .................................... 521/129; 521/130; 521/131; 521/133
[58] Field of Search ................. 521/129, 130, 131, 133

[56] References Cited

U.S. PATENT DOCUMENTS 5,104,904  4/1992  Glynn et al. ........................ 521/129
5,114,980  5/1992  Lili et al. .............................. 521/129

Primary Examiner—Morton Foelak
Attorney, Agent, or Firm—Martin P. Connaughton

[57] ABSTRACT

A process for the production of cellular plastics by the polyisocyanate polyaddition process, by reacting a) an organic and/or modified organic polyisocyanate with
b) at least one relatively high-molecular-weight compound containing at least two reactive hydrogen atoms, and, if desired,
c) a low-molecular-weight chain extender and/or cross-linking agent, in the presence of
d) a blowing agent
e) a catalyst and
f) assistants and/or additives, wherein the blowing agent (d) used
   d1) a low-boiling, fluorinated or perfluorinated tertiary alkylamine, or a mixture of (d1) and at least one physical or chemical blowing agent (d2) which is different from (d1), and blowing agent-containing emulsions comprising the abovementioned blowing agent (d1) or a blowing agent mixture of (d1) and (d2) and the starting components (a), (b), (c) or (b) and (c).

13 Claims, No Drawings

PRODUCTION OF CELLULAR PLASTICS BY THE POLYISOCYANATE POLYADDITION PROCESS, AND LOW-BOILING, FLUORINATED OR PERFLUORINATED, TERTIARY ALKYLAMINES AS BLOWING AGENT-CONTAINING EMULSIONS FOR THIS PURPOSE

The present invention relates to a process for the production of cellular plastics by the polyisocyanate polyaddition process, which plastics are also referred to as polyisocyanate polyaddition products below, in which the blowing agent used is a low-boiling, fluorinated or perfluorinated, tertiary alkylamine (d1) or a mixture of (d1) and at least one further physical and/or chemical blowing agent (d2) which is different from (d1), and in which the blowing agent (d1) is usually sparingly soluble or insoluble, in the necessary amounts, in the organic polyisocyanate or the compound containing at least two reactive hydrogen atoms and is therefore emulsified in at least one of these starting components, and to blowing agent-containing emulsions of the abovementioned blowing agent (d1) or a mixture of (d1) and (d2) and at least one starting component (a), (b) or (c) for the production of the polyisocyanate polyaddition products.

The production of cellular polyisocyanate polyaddition products, for example cellular polyurethane elastomers and flexible, semi-rigid or rigid polyurethane foams, by reacting organic polyisocyanates and/or modified organic polyisocyanates with relatively high-molecular-weight compounds containing at least two reactive hydrogen atoms, for example polyoxyalkylenepolyamines and/or preferably organic polyhydroxyl compounds having molecular weights of, for example, from 500 to 12,000 and, if desired, chain extenders and/or crosslinking agents having molecular weights of approximately 500 in the presence of catalysts, blowing agents, assistants and/or additives has been disclosed in numerous patents and other publications. A suitable choice of the starting components polyisocyanate, relatively high-molecular-weight compound containing reactive hydrogen atoms and, if desired, chain extender and/or crosslinking agent allows elastic or rigid, cellular polyisocyanate polyaddition products and all modifications in between to be produced by this method.

A review on the production of cellular polyurethane (PU) elastomers, polyurethane (PU) foams and polyisocyanurate (PIR) foams, their mechanical properties and their use is given, for example, in the monographs High Polymers, Volume XVI, Polyurethanes, Parts I and II, by J. H. Saunders and K. C. Frisch (Interscience Publishers, New York, 1962 and 1964 respectively), Kunststoff-Handbuch, Volume VII, Polyurethane, 1st Edition, 1966, edited by Dr. R. Vieweg and Dr. A. Höchtlen, and 2nd Edition, 1983, edited Dr. G. Oertel (Carl Hanser Verlag, Munich) and Integralschaumstoffe, edited by Dr. H. Piechota and Dr. H. Röhr (Carl Hanser Verlag, Munich, Vienna, 1975).

Cellular plastics are produced by the polyisocyanate polyaddition process using essentially two types of blowing agent:

low-boiling, inert liquids which evaporate under the conditions of the exothermic polyaddition reaction, for example, alkanes, such as butane, pentane, inter alia, or preferably halogenated hydrocarbons, such as methylene chloride, dichloromonofluoromethane, trichlorofluoromethane, inter alia, and chemical compounds which form blowing gases by a chemical reaction or thermal decomposition. Examples which may be mentioned are the reaction of water with isocyanates to form amines and carbon dioxide, which proceeds synchronously with the polyurethane preparation, and the cleavage of thermally labile compounds, e.g. azoisobutyronitrile, which, as a cleavage product, in addition to nitrogen, gives toxic tetramethylsuccinonitrile or azodicarbonamide, whose use as a constituent of a blowing agent combination is described in EP-A 0 092 740 (CA 1,208,912). While the last-mentioned method, in which thermally labile compounds, e.g. azo compounds, hydrazides, semicarbazides, N-nitroso compounds, benzoxazines, inter alia (Kunststoffe 66 (1976), 10, pages 698 to 701) are usually incorporated into a previously prepared polymer or drum-coated onto the polymer granules and are foamed by extrusion, has remained of minor importance in industry, physical low-boiling liquids, in particular chlorofluoroalkanes, are used worldwide on a large scale for the production of polyurethane and polyisocyanurate foams. The only disadvantage of these blowing gases is environmental pollution. By contrast, the formation of blowing gases by thermal cleavage or chemical reaction gives cleavage products and/or reactive byproducts which are included in or chemically bonded to the polyaddition product and can result in an undesired modification of the mechanical properties of the plastic. In the case of the formation of carbon dioxide from water and isocyanate, urea groups are formed in the polyaddition product and can result in an improvement in the compressive strength or even embrittlement of the polyurethane, depending on their amount.

According to EP-A-351 614, it is furthermore possible to use as blowing agents fluorinated hydrocarbons, perfluorinated hydrocarbons, sulfur hexafluoride or mixtures of at least two of these compounds. Since these fluorinated or perfluorinated blowing agents are sparingly soluble or insoluble in the starting components for the production of the polyisocyanate polyaddition products, they are emulsified in at least one organic and/or modified organic polyisocyanate, at least one relatively high-molecular-weight compound containing at least two reactive hydrogen atoms or a mixture of at least one relatively high-molecular-weight compound containing at least two reactive hydrogen atoms and a low-molecular-weight chain extender and/or crosslinking agent. This method allows the production of cellular plastics having a uniform and fine cell structure. The only disadvantages of this process are the narrow choice of suitable fluorinated or perfluorinated compounds having a boiling point in the necessary range and the high price of these blowing agents. The production of cellular plastics having the cell structure required in industry is restricted to a narrow choice of mixtures of perfluoropentane and perfluorohexane.

Low-boiling hydrocarbons which can be used as blowing agents are soluble i the starting components for the preparation of the polyisocyanate polyaddition products and give cellular plastics having a relatively coarse, frequently non-uniform cell structure and increased thermal conductivity.

The mechanism of foam formation in the preparation of polyisocyanate polyaddition products and the effect of surface-active assistants based on siloxaneoxyalkylene copolymers on this reaction has been described by B. Kanner et al. (J. of cellular Plastics, January, 1969, pages 32 to 39).

It is an object of the present invention to replace all or at least some of the chlorofluorocarbons known as blowing agents for the production of cellular plastics by the polyisocyanate polyaddition process by other, environmentally friendly blowing agents without adversely effecting the fine-celled foam structure, as can be achieved using emulsions based on fluorinated hydrocarbons. It is a further object of the present invention to improve the processing properties of the reaction mixtures containing the blowing agents and to minimize their sensitivity in a variety of foaming equipment.

We have found that, surprisingly, this object is achieved with the aid of low-boiling, fluorinated or perfluorinated, tertiary alkylamines.

The present invention accordingly provides a process for the production of cellular plastics by the polyisocyanate polyaddition process, by reacting a) an organic and/or modified organic polyisocyanate with b) at least one relatively high-molecular-weight compound containing at least two reactive hydrogen atoms, and, if desired, c) a low-molecular-weight chain extender and/or cross-linking agent, in the presence of d) a blowing agent e) a catalyst and f) assistants and/or additives, wherein the blowing agent (d) used is a low-boiling, fluorinated or preferably perfluorinated, tertiary alkylamine.

In a modified embodiment of the process according to the invention, blowing agent (d) used may furthermore be a mixture which contains d1) at least one low-boiling, fluorinated and/or preferably perfluorinated, tertiary alkylamine, and d2) at least one further physical or chemical blowing agent which is different from (d1), or a mixture of at least one such physical blowing agent and at least one such chemical blowing agent.

The present invention furthermore provides blowing agent-containing emulsions which contain i) at least one low-boiling, fluorinated or preferably perfluorinated, tertiary alkylamine having 3 to 9 carbon atoms which is sparingly soluble or insoluble in the starting components (a), (b) and (c), and ii) at least one organic and/or modified organic polyisocyanate (a) or at least one relatively high-molecular-weight compound containing at least two reactive hydrogen atoms (b) or at least one low-molecular-weight chain extender and/or crosslinking agent (c), or a mixture of (b) and (c).

Since the fluorinated or preferably perfluorinated, tertiary alkylamines which can be used according to the invention are, in the amounts necessary as blowing agents, usually sparingly soluble or insoluble in the starting components for the production of the polyisocyanate polyaddition products, these alkylamines are expediently emulsified in at least one of the starting components (a), (b) and (c), preferably in (b) or a mixture of (b) and (c).

Surprisingly, it has been found that emulsions of this type are simple to prepare, relatively stable and easy to handle under a very wide range of processing conditions and are distinguished by improved processing properties. The polyisocyanate polyaddition products produced according to the invention have a uniform, fine-celled structure and good mechanical properties. Particularly noteworthy is their extremely low thermal conductivity. A further advantage is the good chemical degradability of the fluorinated and perfluorinated, tertiary alkylamines in the atmosphere.

The following details apply to the starting components (a) to (f), in particular to the blowing agent or blowing agent mixture (d) which can be used according to the invention for the production of the cellular polyisocyanate polyaddition products, preferably the foams containing urethane groups or urethane and isocyanurate groups:

suitable organic polyisocyanates (a) are conventional aliphatic, cycloaliphatic, araliphatic and preferably aromatic polyisocyanates.

The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and preferably aromatic diisocyanates and polyisocyanates, e.g. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, i.e. products which are obtained by chemical reaction of organic diisocyanates and/or polyisocyanates. Specific examples are ester-, urea-, biuret-, allophanate-, carbodiimide-, isocyanurate-, uretdione- and/or urethane-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate, 4,4'- or 2,4'diphenylmethane diisocyanate mixtures, crude MDI or 2,4- or 2,6-tolylene diisocyanate modified by means of low-molecular-weight diols, triols, dialkylene glycols, trialkylene glycols or polyoxyalkylene glycols having molecular weights of up to 6000, specific examples of di- and polyoxyalkylene glycols, which can be employed individually or as mixtures, being diethylene glycol, dipropylene glycol, polyoxyethylene glycol, triol and/or tetrol, polyoxypropylene glycol, triol and/or tetrol and polyoxypropylene-polyoxyethylene glycol, triol and/or tetrol. NCO-containing prepolymers containing from 25 to 3.5% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15% by weight, preferably from 31 to 21% by weight, of NCO, based on the total weight, e.g. based on 4,4'-, 2,4'- and/or 2,2'-diphenylmethane diisocyanate and/or 2,4- and/or 2,6-tolylene diisocyanate, have also proven successful.

The modified polyisocyanates may be mixed with one another or with unmodified organic polyisocyanates, e.g. 2,4'- or 4,4'-diphenylmethane diisocyanate, crude MDI or 2,4- and/or 2,6-tolylene diisocyanate.

Organic polyisocyanates which have proven particularly successful and are preferred for use for the production of cellular elastomers are NCO-containing prepolymers containing from 25 to 9% by weight of NCO, in particular based on polyether- or polyester-polyols and one or more diphenylmethane diisocyanate isomers, advantageously 4,4'-diphenylmethane diisocyanate and/or modified urethane-containing organic polyisocyanates containing from 33.6 to 15% by weight of NCO, in particular based on 4,4'-diphenylmethane diisocyanate or diphenylmethane diisocyanate isomer mixtures; those for the production of flexible polyurethane foams are mixtures of 2,4- and 2,6-tolylene diisocyanates, mixtures of tolylene diisocyanates and crude MDI or, in particular, mixtures of the abovementioned prepolymers based on diphenylmethane diisocyanate isomers and crude MDI; and that for the production of rigid polyurethane or polyurethane polyisocyanate foams is crude MDI.

The relatively high-molecular-weight compound (b) containing at least two reactive hydrogen atoms expediently has a functionality of from 2 to 8, preferably from 2 to 6, and a molecular weight of from 400 to 8000, preferably from 1200 to 6000. Particular success has been achieved using, for example, polyether-polyamines and/or preferably polyols selected from the group comprising the polyether-polyols, polyester-polyols, polythioetherpolyols, polyester-amides, hydroxyl-containing polyacetals and hydroxyl-containing aliphatic polycarbonates, or mixtures of at least two of said polyols. Particular preference is given to polyester-polyols and/or polyether-polyols.

Suitable polyester-polyols may be prepared, for example, from organic dicarboxylic acids having from 2 to 12 carbon atoms, preferably aliphatic dicarboxylic acids having from 4 to 6 carbon atoms and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or mixed with one another. The free dicarboxylic acids may also be replaced by the corresponding dicarboxylic-acid derivatives, for example dicarboxylic acid esters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, and in particular adipic acid. Examples of dihydric and polyhydric alcohols, in particular alkanediols and dialkylene glycols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol and mixtures of at least two of said diols, in particular mixtures of 1,4-butanediol, 1,5-pentanediol and 1,6-hexanediol. Furthermore, polyester-polyols made from lactones, e.g. ε-caprolactone or hydroxycarboxylic acids, e.g. ω-hydroxycaproic acid, may also be employed.

The polyester-polyols may be prepared by polycondensing the organic, e.g. aromatic and preferably aliphatic polycarboxylic acids and/or derivatives thereof and polyhydric alcohols without using a catalyst or preferably in the presence of an esterification catalyst, expediently in an inert gas atmosphere, e.g. nitrogen, carbon monoxide, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, e.g. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 4, in particular from 2 to 3, and a molecular weight of from 480 to 3000, preferably from 1200 to 3000, in particular from 1800 to 2500.

However, the preferred polyols are polyetherpolyols prepared by conventional processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 8, preferably from 2 to 6, reactive hydrogen atoms in bound form, or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternately one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are alkanolamines, e.g. ethanolamine, N-methyl- and N-ethylethanolamine, dialkanolamines, e.g. diethanolamine, N-methyl- and N-ethyl-diethanolamine, and trialkanolamines, e.g. triethanolamine, and ammonia. Preference is given to polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

The polyether-polyols, preferably polyoxypropylene- and polyoxypropylene-polyoxyethylene-polyols, have a functionality of from 2 to 6, in particular from 2 to 4, and molecular weights of from 400 to 8000, preferably from 1200 to 6000, in particular from 1800 to 4000, and suitable polyoxytetramethylene glycols have a molecular weight of up to approximately 3500.

Other suitable polyether-polyols are polymer-modified polyether-polyols, preferably graft polyether-polyols, in particular those based on styrene and/or acrylonitrile and prepared by in-situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Pat. No(s). 11 11 394, 12 22 669 (U.S. Pat. No(s). 3,304,273, 3,383,351 and 3,523,093), 11 52 536 (GB No. 1,040,452) and 11 52 537 (GB No. 987,618), and polyether-polyol dispersions which contain, as the disperse phase, usually in an amount of from 1 to 50% by weight, preferably from 2 to 25% by weight, for example polyureas, polyhydrazides, polyurethanes containing tertamino groups in bound form, and/or melamine and are described, for example, in EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. Furthermore, they may be mixed with the graft polyether-polyols or polyester-polyols and the hydroxyl-containing polyester-amides, polyacetals, polycarbonates and/or polyether-polyamines.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g. diphenyl carbonate, or phosgene.

The polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

Suitable polyether-polyamines can be prepared from the abovementioned polyether-polyols by known processes. The examples which may be mentioned are the cyanoalkylation of polyoxyalkylene-polyols and a subsequent hydrogenation of the resultant nitrile (U.S. Pat. No. 3,267,050) or the partial or complete amination of polyoxyalkylene-polyols using amines or ammonia in the presence of hydrogen and catalysts (DE No. 12 15 373).

The polyisocyanate polyaddition products, and preferably urethane- or urethane- and isocyanurate-containing foams, may be prepared with or without the use of chain extenders and/or crosslinking agents (c). However, it may prove advantageous, in order to modify the mechanical properties, for example the hardness, to add chain extenders, crosslinking agents or, if desired, mixtures thereof. The chain extenders and/or crosslinking agents used are diols and/or triols, having a molecular weight of less than 400, preferably from 60 to 300. Examples are dialkylene glycols and aliphatic, cycloaliphatic and/or araliphatic diols having from 2 to 14 carbon atoms, preferably from 4 to 10 carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, glycerol and trimethylolpropane, and low-molecular-weight hydroxyl-containing polyalkylene oxides, based on ethylene oxide and/or 1,2-propylene oxide, and the above-mentioned diols and/or triols as initiator molecules.

Cellular polyurethane-polyurea elastomers can also be prepared using secondary aromatic diamines, primary aromatic diamines, 3,3'-di- and/or 3,3',5,5'-tetraalkyl-substituted diaminodiphenylmethanes as chain extenders or crosslinking agents instead of or mixed with the abovementioned diols and/or triols.

Examples of secondary aromatic diamines are N,N'-dialkyl-substituted aromatic diamines, which are unsubstituted or substituted on the aromatic radical by alkyl radicals, having 1 to 20, preferably 1 to 4, carbon atoms in the N-alkyl radical, e.g. N,N'-diethyl-, N,N'-di- sec-pentyl-, N,N'-di-sec-hexyl-, N,N'-di-sec-decyl- and N,N'-dicyclohexyl-p- and m-phenylenediamine, N,N'-dimethyl-, N,N'-diethyl-, N,N'-diisopropyl-, N,N'-di-sec-butyl- and N,N'-dicyclohexyl-4,4'-diaminodiphenylmethane and N,N'-di-sec-butylbenzidine.

The aromatic diamines used are expediently those which have at least one alkyl substituent in the orthoposition to the amino groups, are liquid at room temperature and are miscible with component (b), in particular the polyether-polyols. Furthermore, alkyl-substituted meta-phenylenediamines of the formulae

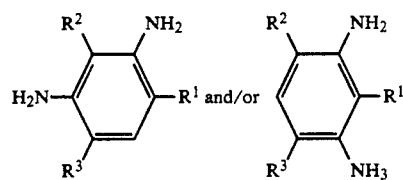

where $R^3$ and $R^2$ are identical or different and are methyl, ethyl, propyl or isopropyl, and $R^1$ is linear or branched alkyl having 1 to 10 carbon atoms, preferably 4 to 6 carbon atoms, have proven successful.

Particularly successful are those alkyl radicals $R^1$ in which the branching point is on the $C^1$ carbon atom.

Specific examples of radicals $R^1$ are methyl, ethyl, isopropyl, 1-methyloctyl, 2-ethyloctyl, 1-methylhexyl, 1,1-dimethylpentyl, 1,3,3-trimethylhexyl, 1-ethylpentyl, 2-ethylpentyl and preferably cyclohexyl, 1-methyl-n-propyl, tert-butyl, 1-ethyl-n-propyl, 1-methyl-n-butyl and 1,1-dimethyl-n-propyl.

Examples of suitable alkyl-substituted m-phenylenediamines are 2,4-dimethyl-6-cyclohexyl-, 2-cyclohexyl-4,6-diethyl-, 2-cyclohexyl-2,6-isopropyl-, 2,4-dimethyl-6-(1-ethyl-n-propyl)-, 2,4-dimethyl-6-(1,1-dimethyl-n-propyl)- and 2-(1-methyl-n-butyl)-4,6-dimethyl-1,3-phenylenediamine. Preference is given to 1-methyl-3,5-diethyl-2,4- and -2,6-phenylenediamines, 2,4-dimethyl-6-tert-butyl-, 2,4-dimethyl-6-isooctyl- and 2,4-dimethyl-6-cyclohexyl-1,3-phenylenediamine.

Examples of suitable 3,3'-di- and 3,3',5,5'-tetra-n-alkyl-substituted 4,4'-diaminodiphenylmethanes are 3,3'-di-, 3,3',5,5'-tetramethyl-, 3,3'-di-, 3,3',5,5'-tetraethyl-, 3,3'-di- and 3,3',5,5'-tetra-n-propyl-4,4'-diaminodiphenylmethane.

Preference is given to diaminodiphenylmethanes of the formula

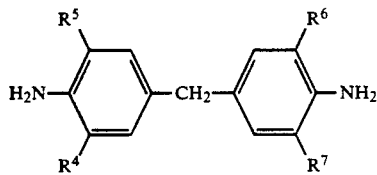

where $R^4$, $R^5$, $R^6$ and $R^7$ are identical or different and are methyl, ethyl, propyl, isopropyl, sec-butyl or tert-butyl, but where at least one of the radicals must be isopropyl or sec-butyl. The 4,4'-diaminodiphenylmethanes may also be used in a mixture with isomers of the formulae

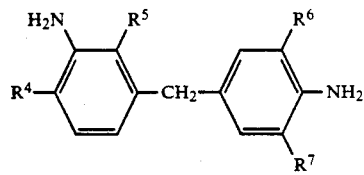

and/or

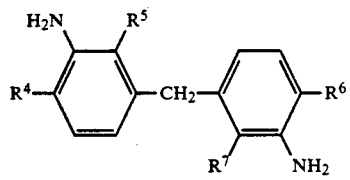

where $R^4$, $R^5$, $R^6$ and $R^7$ are as defined above.

Preference is given to 3,5-dimethyl-3', 5'-diisopropyl- and 3,3',5,5'-tetraisopropyl-4,4'diaminodiphenylmethane. The diaminodiphenylmethanes can be employed individually or in the form of mixtures.

Said chain extenders and/or crosslinking agents (c) can be used individually or as mixtures of identical or different types of compounds.

The amount of chain extender, crosslinking agent or mixture thereof used, if any, is expediently from 2 to 60% by weight, preferably from 8 to 50% by weight, in particular from 10 to 40% by weight, based on the weight of components (b) and (c).

The blowing agent (d) used according to the invention is a low-boiling, fluorinated or preferably perfluorinated, tertiary alkylamine (d1) or a mixture of such alkylamines. The fluorinated, tertiary alkylamine used is preferably predominantly, i.e. at least 50%, preferably at least 80%, in particular at least 90%, fluorinated and expediently has at least one, preferably one, bonded hydrogen atom. As stated above, fluorinated or perfluorinated, tertiary alkylamines of this type in the amounts necessary for formation of foams preferably containing urethane or urethane and isocyanurate groups are sparingly soluble or insoluble in the starting components (a), (b) and (c) or in mixtures of (b) and (c), and they are therefore emulsified in at least one of these starting components (a), (b) and (c), preferably in (b) or a mixture of (b) and (c) or the liquid reaction mixture comprising (a), (b), (d) to (f) and, if used, (c). Highly suitable blowing agents are the fluorinated or perfluorinated, tertiary alkylamines having 3 to 9 carbon atoms, preferably 4 to 6 carbon atoms, which are liquid at room temperature, particularly preferably the perfluorinated, tertiary alkylamines.

Specific examples of suitable (per)fluorinated, tertiary alkylamines are perfluorodimethylethylamine, perfluorodiethylmethylamine, perfluorotrimethylamine, perfluorotriethylamine, perfluorodimethyl-n-propylamine, perfluorodiethyl-n-propylamine, perfluoro-tri-n-propylamine and perfluorodimethylisopropylamine, and the corresponding partially fluorinated tertiary alkylamines. The fluorinated and/or preferably perfluorinated, tertiary amines may be employed individually or in the form of mixtures. The preferred blowing agent (d) is perfluorodimethylisopropylamine.

The blowing agent (d) for the production of the cellular plastics by the process according to the invention may alternatively be a mixture containing or preferably comprising d1) at least one low-boiling, fluorinated or preferably perfluorinated, tertiary alkylamine, or a mixture of such alkylamines nd d2) at least one further physical blowing agent and/or chemical blowing agent which is different from (d1), or a mixture of such physical and chemical blowing agents.

Examples of suitable physical blowing agents which are different from (d1) are:

alkanes having 4 to 12 carbon atoms, preferably 5 or 6 carbon atoms, cycloalkanes having 4 to 6 carbon atoms, preferably 5 or 6 carbon atoms, linear or cyclic, saturated or olefinically unsaturated ethers having 2 to 5 carbon atoms, aliphatic carboxylic acid esters having a maximum boiling point of 142° C., preferably below 80° C., aliphatic and/or cycloaliphatic ketones having 3 to 5 carbon atoms, partially halogenated chlorofluorocarbons having 1 or 2 carbon atoms, perfluorinated, linear or cyclic ethers having 4 to 12 carbon atoms, preferably 4 to 6 carbon atoms, and preferably fluorinated or perfluorinated, advantageously aliphatic or cycloaliphatic hydrocarbons having 3 to 8 carbon atoms, preference being given to aliphatic or cycloaliphatic, fluorinated hydrocarbons having 3 to 6 carbon atoms which are liquid at room temperature and contain at least one bonded hydrogen atom and aliphatic or cycloaliphatic, perfluorinated hydrocarbons having 4 to 7 carbon atoms.

Specific examples of physical blowing agents (d2) of the said type are gaseous or preferably liquid, linear or branched alkanes, e.g. butane, n- and isopentane and technical-grade pentane mixtures, n- and isohexanes, n- and isoheptanes, n- and isooctanes, n- and isononanes, n- and isodecanes, n- and isoundecanes and n- and isododecanes. Since very good results with respect to the stability of the emulsions, the processing properties of the reaction mixture and the mechanical properties of the cellular polisocyanate polyaddition products produced are achieved when n-pentane, isopentane or n-hexane, or a mixture thereof, is used, these alkanes are preferably employed. Furthermore, specific examples of cycloalkanes are cyclobutane, preferably cyclopentane, cyclohexane or mixtures thereof, specific examples of linear or cyclic ethers are dimethyl ether, diethyl ether, methyl ethyl ether, vinyl methyl ether, vinyl ethyl ether, divinyl ether, tetrahydrofuran and furan, specific examples of aliphatic carboxylic acid esters are methyl, ethyl, n-propyl, isopropyl and butyl acetate and preferably methyl and ethyl formate, specific examples of ketones are acetone, methyl ethyl ketone and cyclopentanone, specific examples of partially halogenated chlorofluorocarbons are difluoromonochloromethane (R 22), 1,1,1-trifluoro-2,2-dichloroethane (R 123) and 1,1,1-dichloromonofluoroethane (R 141b), specific examples of perfluorinated, linear or cyclic ethers are perfluorodiethyl ether, perfluorodipropyl ether and perfluoroethyl propyl ether, oligomers of perfluoropropylene oxide having a maximum boiling point of 135° C., perfluorotetrahydrofuran, perfluoroalkyltetrahydrofurans and perfluorofuran. Aliphatic or cycloaliphatic, fluorinated or perfluorinated hydrocarbons which are gases at room temperature e.g. perfluoropropane, perfluorobutane and perfluorocyclobutane, which can be liquefied under pressure, for example up to about 25 bar, mixed and emulsified are also highly suitable.

However, physical blowing agents (d2) which have proven eminently suitable and are therefore preferred are aliphatic or cycloaliphatic, fluorinated or perfluorinated hydrocarbons which are liquid at room temperature. The fluorinated hydrocarbons used are expediently those which are predominantly, for example at least 85%, fluorinated and contain at least one, preferably one, bonded hydrogen atom. Examples of suitable fluorinated hydrocarbons are trifluoromethane, difluoromethane, difluoroethane, tetrafluoroethane and preferably hexafluoropropane, heptafluoropropane, 1-H-perfluorobutane and 1-H-perfluorohexane. Examples of suitable perfluorinated hydrocarbons are perfluoropentane, perfluorohexane, perfluoroheptane, perfluorooctane, perfluorocyclopentane and perfluorocyclohexane. The fluorinated or perfluorinated hydrocarbons or mixtures thereof, like the other suitable physical blowing agents, can be employed individually or in the form of mixtures. It is also possible to use mixtures of the different physical blowing agents.

The blowing agent mixtures (d) which can be used according to the invention advantageously contain the low-boiling, fluorinated and/or perfluorinated, tertiary alkylamine (d1) and the further physical blowing agent (d2) which is different from (d1), preferably the fluorinated and/or perfluorinated hydrocarbon, in a weight ratio of from 90:10 to 10:90, preferably from 80:20 to 60:40. If the physical blowing agent is insoluble in the starting components (a), (b) and (c) in the necessary amounts, it is expediently emulsified in at least one of the starting components together with the low-boiling, fluorinated and/or perfluorinated, tertiary alkylamine.

In addition to the low-boiling, fluorinated and/or perfluorinated, tertiary alkylamine (d1) which can be used according to the invention as blowing agent, or a mixture of (d1) and the other physical blowing agent which is different from (d1), or in place of the physical blowing agent which is different from (d1), it is also possible to use a chemical blowing agent. A particularly proven chemical blowing agent is water, which reacts with the organic, modified or unmodified polyisocyanate (a) to form carbon dioxide, the actual blowing agent, and urea groups, and thus effects the compressive strength of the end products. Other suitable chemical blowing agents are organic mono- and polycarboxylic acids having a molecular weight of from 60 to 300 and preferably formic acid, and ammonium and/or amine salts of formic acid and/or of the abovementioned mono- and/or polycarboxylic acids, so long as these react with isocyanates under the reaction conditions and form carbon dioxide.

The organic carboxylic acids used are advantageously aliphatic mono- and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids expediently contain at least one further group which is reactive toward isocyanates, e.g. a mercapto group, a primary and/or secondary amino group or preferably a primary and/or secondary hydroxyl group.

Suitable carboxylic acids are thus substituted or unsubstituted monocarboxylic acids, e.g. acetic acid, propionic acid, 2-chloropropionic acid, 3-chloropropionic acid, 2,2-dichloropropionic acid, hexanoic acid, 2-ethylhexanoic acid, cyclohexanecarboxylic acid, dodecanoic acid, palmitic acid, stearic acid, oleic acid, 3-mercaptopropionic acid, glycolic acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedioic acid, tartaric acid, phthalic acid, isophthalic acid and citric acid.

The amine salts are usually formed using slightly basic amines, e.g. triethylamine, dimethylbenzylamine or hydrazine.

Since the amount of water present as a byproduct in the polyester- and polyether-polyols is frequently sufficient, there is frequently no need to add any further chemical blowing agent. However, water is preferably additionally introduced into the polyurethane formulation, usually in an amount of from 0.05 to 5% by weight, preferably from 0.5 to 4% by weight, based on the weight of starting components (a) to (c).

Suitable blowing agent mixtures (d) thus expediently contain, based on the total weight of (d1) and (d2), d1) at least 30% by weight, preferably at least 60% by weight, of at least one low-boiling, fluorinated and/or perfluorinated, tertiary alkylamine, and d2) a maximum of 70% by weight, preferably less than 40% by weight, of at least one further physical and/or chemical blowing agent which is different from (d1).

The most expedient amount of low-boiling, fluorinated or preferably perfluorinated tertiary alkylamine (d1) as blowing agent for the production of the cellular polyisocyanate polyaddition products depends on the desired density and on whether any water is employed as the preferred chemical blowing agent. The necessary amount of blowing agent can easily be determined experimentally. In general, amounts of from 1 to 40 parts by weight, preferably from 1 to 15 parts by weight, in particular from 3 to 10 parts by weight, of the (per)fluorinated, tertiary alkylamine (d1) or preferably of the blowing agent mixture comprising (d1) and (d2), based on 100 parts by weight of the starting components (a) to (c) or (a) and (b), give satisfactory results.

The (per)fluorinated, tertiary alkylaine (d1) which is suitable according to the invention as blowing agent, or the mixture of (d1) and (d2), is, for processing, preferably emulsified in the starting components (a), (b) or a mixture of (b) and (c) or in (a) and (b), the soluble physical or chemical blowing agent (d2) of the blowing agent mixture (d) dissolving homogeneously in the starting components.

The emulsifiers known from polyurethane chemistry are suitable for producing blowing agent-containing emulsions of this type. The emulsifiers employed are in particular oligomeric acrylates containing bonded polyoxyalkylene and fluoroalkane radicals as side groups and having a fluorine content of from approximately 5 to 30% by weight. Oligomeric acrylates of this type are sufficiently well known from polymer chemistry, for example as adhesion promoters in reinforced plastics, and further details are thus superfluous. Their structure and processes for their preparation, and suitable fluoroaliphatic radicals and precursors containing active hydrogen which can be used for the preparation of the oligomers described are described in detail, for example, in DE-B-23 10 357 and U.S. Pat. No. 3,787,351, which is equivalent thereto, and in the patents and literature cited therein, and in DE-A-38 24 355. The statements made in these publications, in particular in U.S. Pat. No. 3,787,351, are incorporated fully into the application description and are regarded as a constituent thereof.

The oligomeric acrylates containing polyoxyalkylene and fluoroalkane radicals as side groups which are suitable, for example, as emulsifiers are expediently employed in an amount from 0.01 to 6 parts by weight, preferably from 0.2 to 3.5 parts by weight, in particular from 0.5 to 2.0 parts by weight, based on 100 parts by weight of the starting components (a), (b) or the mixture of (b) and (c).

Suitable compounds for the emulsification of the (per)fluorinated tertiary alkylamine (d1) or the blowing agent mixture comprising (d1) and (d2) are, as stated above, the organic and/or modified organic polyisocyanate (a), the relatively high-molecular-weight compound containing at least two reactive hydrogen atoms (b) and the low-molecular-weight chain extender nd/or crosslinking agent (c). Mixtures of (b) and low-molecular-weight chain extenders and/or crosslinking agents (c) are also suitable.

If an organic and/or modified organic polyisocyanate (a) is used as the other emulsion phase, preference is given to aromatic polyisocyanates selected from the group comprising 2,4- and 2,6-tolylene diisocyanates and mixtures of said isomers, 4,4'-, 2,4'- and 2,2'-diphenylmethane diisocyanates and mixtures of at least two of said isomers, and mixtures of diphenylmethane diisocyanates and polyphenyl-polymethylene polyisocyanates. If the organic polyisocyanates are crystalline at room temperature, they are liquefied by mixing with liquid polyisocyanates and/or by suitable partial modification, e.g. carbodiimidization and/or urethanization.

However, the other emulsion phase is preferably the relatively high-molecular-weight compound containing at least two reactive hydrogen atoms. Particularly suitable are polyester-polyols or mixtures thereof having a functionality of from 2 to 3 and a molecular weight of from 480 to 3000 and polyether-polyols or mixtures thereof having a functionality of from 2 to 6 and a molecular weight of from 400 to 8000, these expediently being selected from the group comprising the polyoxyethylene-, polyoxypropylene- and polyoxypropylene-polyoxyethylene-polyols and polyoxytetramethylene glycols, or mixtures thereof.

The blowing agent-containing emulsion according to the invention thus preferably contains or comprises i) at least one low-boiling, fluorinated or preferably perfluorinated, tertiary alkylamine having 3 to 9 carbon atoms which is sparingly soluble or insoluble in the starting components (a), (b) and (c), or a mixture of such alkylamines, and ii) at least one organic and/or modified organic polyisocyanate (a) or at least one relatively high-molecular-weight compound containing at least two reactive hydrogen atoms (b) or at least one low-molecular-weight chain extender and/or crosslinking agent (c), or a mixture of (b) and (c).

Particularly successful blowing agent-containing emulsions are those which comprise i) from 1 to 40 parts by weight, preferably from 1 to 15 parts by weight, in particular from 3 to 10 parts by weight, per 100 parts by weight of (a), (b) or (b) and (c), of at least one low-boiling, fluorinated or preferably perfluorinated, tertiary alkylamine (d1) having 3 to 9 carbon atoms, preferably 4 to 6 carbon atoms, which is sparingly soluble or insoluble in the starting components (a), (b) and (c), or a blowing agent mixture (d) which itself comprises (d1) and at least one low-boiling, physical agent (d2) which is different from (d1) and is sparingly soluble or insoluble in (a) to (c), preferably a fluorinated and/or perfluorinated hydrocarbon having 3 to 8 carbon atoms of in particular at least one partially fluorinated hydrocarbon having 3 to 6 carbon atoms or at least one perfluorinated hydrocarbon having 4 to 7 carbon atoms, and ii) at least one organic and/or modified organic polyisocyanate (a) or at least one relatively high-molecular-weight compound containing at least two reactive hydrogen atoms (b) or at least one low-molecular-weight chain extender an/or crosslinking agent (c), or a mixture of (b) and (c).

To prepare the storage-stable, blowing agent-containing emulsions, the starting components (a) or (b) or (c) or a mixture of (b) and (c) and the (per)fluorinated, tertiary alkylamine (d1) or the blowing agent mixture comprising (d1) and (d2) is mixed vigorously, expediently in the presence of an emulsifier, preferably an oligomeric acrylate, at from 0° to 70° C., preferably from 20° to 40° C. Examples of suitable mixing units for this purpose are static mixers, e.g. an SMX from Sulzer (Switzerland), or dynamic mixers, e.g. propeller stirrers or Ultra-Turrax ® from Hanke und Kunkel (Germany).

The catalysts (e) used to produce the cellular plastics by the polyisocyanate-polyaddition process are, in particular, compounds which greatly accelerate the reaction of the hydroxyl-containing compound of component (b) and, if used, (c) with the organic, modified or unmodified polyisocyanate (a). Suitable compounds are organometallic compounds, preferably organotin compounds, such as tin(II) salts of organic carboxylic acids, e.g. tin(II) acetate, tin(II) octanoate, tin(II) ethylhexanoate and tin(II) laurate, and dialkyltin(IV) salts of organic carboxylic acids, e.g. dibutyltin diacetate, dibutyltin dilaurate, dibutyltin maleate and dioctyltin diacetate. The organometallic compounds are employed alone or preferably in combination with highly basic amines, for example amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N,-tetramethylethylene-diamine, N,N,N',N,-tetramethylbutanediamine, N,N,N',N,-tetramethyl-1,6hexanediamine, pentamethyldiethylenetriamine, tetramethyldiaminoethyl ether, bis(dimethylaminopropyl-)urea, dimethylpiperazine, 1,2-dimethylimidazole, 1-azabicyclo[3.3.0]octane and, preferably, 1,4-diazabicyclo[2.2.2]octane and alkanolamine compounds such as triethanolamine, triisopropanolamine, N-methyl- and N-ethyldiethanolamine and dimethylethanolamine.

Other suitable catalysts are tris(dialkylamino-alkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides, such as sodium methoxide and potassium isopropoxide, and alkali metal salts of long-chain fatty acids having from 10 to 20 carbon atoms and possibly containing lateral OH groups. From 0.001 to 5% by weight, in particular from 0.05 to 2% by weight, of catalyst or catalyst combination is preferably used, based on the weight of component (b).

If desired, assistants and/or additives (f) can be incorporated into the reaction mixture for the production of the cellular plastics by the polyisocyanate polyaddition process. Specific examples are surfactants, foam stabilizers, cell regulators, fillers, dyes, pigments, flameproofing agents, hydrolysis-protection agents, and fungistatic and bacteriostatic substances the plastics.

Examples of suitable surfactants are compounds which serve to support homogenization of the starting materials and may also regulate the cell structure of the plastics. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, e.g. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore the above-described oligomeric acrylates containing polyoxyalkylene and fluoroalkane radicals s side groups. The surfactants are usually used in amounts of from 0.01 to 5 arts by weight, based on 100 parts by weight of component (b).

For the purposes of the invention, fillers, in particular reinforcing fillers, are conventional organic and inorganic fillers, reinforcing agents, wetting agents, agents for improving the abrasion behavior in paints, coating agents, etc. Specific examples are inorganic fillers, such as silicate minerals, for example phyllosilicates, such as antigorite, serpentine, hornblendes, amphiboles, chrysotile, and talc; metal oxides, such as kaolin, aluminum oxides, titanium oxides and iron oxides, metal salts, such as chalk, baryte and inorganic pigments, such as cadmium sulfide, zinc sulfide and glass, inter alia. Preference is given to kaolin (china clay), aluminum silicate and coprecipitates of barium sulfate and aluminum silicate, and natural and synthetic fibrous minerals, such as wollastonite, and metal and, in particular, glass fibers of various lengths, which may be sized. Examples of suitable organic fillers are carbon black, melamine, colophony, cyclopentadienyl resins and graft polymers, and cellulose fibers, polyamide fibers, polyacrylonitrile fibers, polyurethane fibers, and polyester fibers based on aromatic and/or aliphatic dicarboxylic acid esters, and in particular carbon fibers.

The inorganic and organic fillers may be used individually or as mixtures and are advantageously introduced into the reaction mixture in amounts of from 0.5 to 50% by weight, preferably from 1 to 40% by weight, based on the weight of components (a) to (c), but the content of mats, nonwovens and wovens made from natural and synthetic fibers may reach values of up to 80% by weight.

Examples of suitable flameproofing agents are tricresyl phosphate, tris(2-chloroethyl) phosphate, tris(-chloropropyl) phosphate and tris(2,3-dibromopropyl) phosphate.

In addition to the abovementioned halogen-substituted phosphates, it is also possible to use inorganic or organic flameproofing agents, such as red phosphorus, aluminum oxide hydrate, antimony trioxide, arsenic oxide, ammonium polyphosphate (Exolit ®) and calcium sulfate, expandable graphite or cyanuric acid derivatives, e.g. melamine, or mixtures of two or more flameproofing agents, e.g. ammonium polyphosphates and melamine, and, if desired, corn starch, or ammonium polyphosphate, melamine and expandable graphite and/or, if desired, aromatic polyesters, in order to flameproof the polyisocyanate polyaddition products. In general, it has proven expedient to use from 5 to 50 parts by weight, preferably from 5 to 25 parts by weight, of said flameproofing agents per 100 parts by weight of component (b).

Further details on the other conventional assistants and additives mentioned above can be obtained from the specialist literature, for example from the monograph by J. H. Saunders and K. C. Frisch, High Polymers, Volume XVI, Polyurethanes, Parts 1 and 2, Interscience Publishers 1962 and 1964 respectively, or Kunststoff-Handbuch, Polyurethane, Volume VII, Carl-Hanser-Verlag, Munich, Vienna, 1st and 2nd Editions, 1966 and 1983.

To produce the cellular urea- and/or preferably urethane-containing plastics, the organic polyisocyanate (a), the relatively high-molecular-weight compound containing at least two reactive hydrogen atoms (b) and, if used, the chain extender and/or crosslinking agent (c) are reacted in such amounts that the ratio between the number of equivalents of NCO groups in the polyisocyanate (a) and the total number of reactive hydrogen atoms in component (b) and, if used, (c) is from 1:0.85 to 1.25, preferably from 1:0.95 to 1.15. If the cellular plastics, at least in part, contain bonded isocyanurate groups, a ratio between the number of NCO groups in the polyisocyanate (a) and the total number of reactive hydrogen atoms in component (b) and, if used, (c) of from 1.5 to 60:1, preferably from 1.5 to 8:1, is usually used.

The cellular plastics made from polyisocyanate polyaddition products, preferably cellular elastomers or in particular foams, are advantageously produced by the one-shot process, for example using reaction injection moldings or the high-pressure or low-pressure method, in an open or closed mold, for example in a metallic mold. It has proven particularly advantageous to us the two-component method and to combine the starting components (b), (d), (e) and, if used, (c) and (f) in component (A) and to use the organic or modified polyisocyanate (a) or a mixture of said polyisocyanates and, if used, the blowing agent (d) as component (B).

The starting components are mixed at from 15 to 90° C., preferably at from 20 to 35° C., and introduced into the open or closed mold, if desired under super-atmospheric pressure. The mixing can, as stated above, be carried out mechanically by means of a stirrer or a stirring screw or under high pressure by the countercurrent injection method. The mold temperature is expediently from 20° to 110° C., preferably from 30° to 60° C., in particular from 45° to 50° C.

The cellular elastomers produced by the process according to the invention have densities of from approximately 0.76 to 1.0 g/cm$^3$, preferably from 0.9 to 1.0 g/cm$^3$; the density of filler-containing products can achieve higher values, for example of up to 1.4 g/cm$^3$ or more. Moldings made from cellular elastomers of this type are used in the automotive industry, for example as headrests, external parts, e.g. rear spoilers and bumpers, and internal panelling, and as shoe soles.

The soft-elastic, semirigid and rigid foams produced by the process according to the invention and the corresponding structural foams have a density of from 0.02 to 0.75 g/cm$^3$, the density of the foams preferably being from 0.025 to 0.24 g/cm$^3$, in particular from 0.03 to 0.1 g/cm$^3$, and the density of the structural foams preferably being from 0.08 to 0.75 g/cm$^3$, in particular from 0.24 to 0.6 g/cm$^3$. The foams and structural foams are used, for example, in the vehicle industry, for example in the automotive, aircraft and shipbuilding industries, and in the furniture and sports goods industries, for example as cushioning materials, housing parts, ski boot inners, ski cores, inter alia. They are particularly suitable as insulation materials in the construction and refrigeration sectors, for example as intermediate layers for sandwich elements or for foam-filling refrigerator and freezer housings.

The storage-stable, blowing agent-containing emulsions according to the invention are used, in particular, for the production of urethane- or urethane- and isocyanurate-containing foams and urethane- and/or urea-containing cellular elastomers by the polyisocyanate polyaddition process.

EXAMPLE 1 a) Preparation of a blowing agent-containing emulsion

To a mixture of 83 parts by weight of a polyether-polyol having a hydroxyl number of 400, prepared from sucrose as initiator molecule and 1,2-propylene oxide, 10 parts by weight of a polyether-diol having a hydroxyl number of 105, prepared from 1,2-propanediol and 1,2-propylene oxide, 2 parts by weight of polysiloxane foam stabilizer (Tegostab ® B 8406 from Goldschmidt AG, Essen), 2 parts by weight of N,N-dimethylcyclohexylamine and 3 parts by weight of water were added with vigorous stirring 18 parts by weight of perfluorodimethylisopropylamine.

A milky-white emulsion of the perfluoro compound in the water-containing polyether-polyol mixture was produced.

b) Production of a rigid polyurethane foam 123 parts by weight of a mixture of diphenylmethane diisocyanates and polyphenyl-polymethylene polyisocyanates having an NCO content of 31% by weight (Lupranat ® M 20S from BASF AG) were added with vigorous stirring at 23° C. to 100 parts by weight of the emulsion prepared in 1a, and the foamable reaction mixture was introduced into an open mold, where it was allowed to expand.

A very fine-celled, rigid polyurethane foam having a mean pore diameter of 145 μm and a density of 33 g/l was obtained. The proportion of closed cells was 93%, and the thermal conductivity was 17 mW/mK.

COMPARATIVE EXAMPLE

The procedure was similar to that of Example 1, but the perfluorodimethylisopropylamine was replaced by the same amount of the CFC monofluorotrichloromethane.

A coarser-celled rigid polyurethane foam having a cell diameter of approximately 420 μm and a thermal conductivity of 19.5 mW/mK was obtained.

EXAMPLE 2 a) Preparation of a blowing agent-containing emulsion

To a mixture of 82.5 parts by weight of a polyether-polyol having a hydroxyl number of 400, prepared from sucrose as initiator molecule and 1,2-propylene oxide, 10 parts by weight of a polyether-diol having a hydroxyl number of 105, prepared from 1,2-propanediol and 1,2-propylene oxide, 2 parts by weight of N,N-dimethylcyclohexylamine 2.5 parts by weight of polysiloxane foam stabilizer (Tegostab ® B 8406 from Goldschmidt AG, Essen), and 3 parts by weight of water were added with vigorous stirring a mixture of 9 parts by weight of perfluorodimethylisopropylamine and 9.5 parts by weight of perfluorohexane.

A milky-white emulsion of the perfluorodimethylisopropylamine and perfluorohexane in the water-containing polyether-polyol mixture was produced.

b) Production of a rigid polyurethane foam 145 parts by weight of a mixture of diphenylmethane diisocyanates and polyphenyl-polymethylene polyisocyanates having an NCO content of 31% by weight (Lupranat® M 20S from BASF AG) was added with vigorous stirring at 23° C. to 100 parts by weight of the emulsion prepared in 2a, and the mixture was introduced into an open mold, where it was allowed to expand.

A very fine-celled, rigid polyurethane foam having a mean pore diameter of 130 μm and a density of 38 g/l was obtained. The proportion of closed cells was 91%, and the thermal conductivity was 18.1 mW/mK.

EXAMPLE 3

(a) Preparation of a blowing agent-containing emulsion

The procedure was similar to that of Example 2, but a blowing agent mixture comprising 9 parts by weight of perfluoromethyldiethylamine and 2.4 parts by weight of n-hexane was used.

An emulsion of the perfluoromethyldiethylamine and n-hexane in the water-containing polyol mixture was produced.

b) Production of a rigid polyurethane foam 154 parts by weight of a mixture of diphenylmethane diisocyanates and polyphenyl-polymethylene polyisocyanates having an NCO content of 31% by weight (Lupranat® M 20S) was added with vigorous stirring at 23° C. to 100 parts by weight of the emulsion prepared in 3a, and the reaction mixture was introduced into an open mold, where it was allowed to expand.

A fine-celled, rigid polyurethane foam having a mean pore diameter of 163 μm and a density of 35.8 g/l was obtained. The proportion of closed cells was 93%, and the thermal conductivity was 18.8 mW/mK.

EXAMPLE 4

(a) Preparation of a blowing agent-containing emulsion

The procedure was similar to that of Example 2, but a blowing agent mixture comprising 9 parts by weight of perfluoromethyldiethylamine and 9 parts by weight of 1H-perfluorohexane was used.

An emulsion of the perfluoromethyldiethylamine and 1H-perfluorohexane in the water-containing polyol mixture was produced.

b) Production of a rigid polyurethane foam 144 parts by weight of a mixture of diphenylmethane diisocyanates and polyphenyl-polymethylene polyisocyanates having an NCO content of 31% by weight (Lupranat® M 20S) was added with vigorous stirring at 23° C. to 100 parts by weight of the emulsion prepared in 4a, and the reaction mixture was introduced into an open mold, where it was allowed to expand.

A fine-celled, rigid polyurethane foam having a mean pore diameter of 400 μm and a density of 36.1 g/l was obtained. The proportion of closed cells was 93%, and the thermal conductivity was 20.8 mW/mK.

We claim:

1. A process for the production of cellular plastics by the polyisocyanate polyaddition process, by reacting
   a) an organic and/or modified organic polyisocyanate with
   b) at least one relatively high-molecular-weight compound containing at least two reactive hydrogen atoms, and, if desired,
   c) a low-molecular-weight chain extender and/or cross-linking agent,
in the presence of
   d) a blowing agent
   e) a catalyst and
   f) assistants and/or additives,
wherein the blowing agent (d) used is a low-boiling, fluorinated or perfluorinated, tertiary alkylamine.

2. A process as claimed in claim 1, wherein the blowing agent (d) used is a low-boiling, fluorinated or perfluorinated, tertiary alkylamine which is sparingly soluble or insoluble in (a) to (c), or a mixture of such alkylamines, and the alkylamine is emulsified in at least one of the starting components (a), (b) and (c).

3. A process as claimed in claim 1, wherein the low-boiling fluorinated or perfluorinated, tertiary alkylamine contains from 3 to 9 bonded carbon atoms.

4. A process as claimed in claim 1, wherein the blowing agent (d) used is perfluorodimethylisopropylamine.

5. A process as claimed in claim 1, wherein the low-boiling, fluorinated or perfluorinated, tertiary alkylamine as blowing agent (d) is used in an amount from 1 to 40 parts by weight, based on 100 parts by weight of the starting components (a) to (c) or (a) and (b).

6. A process for the production of cellular plastics by the polyisocyanate polyaddition process, by reacting
   a) an organic and/or modified organic polyisocyanate with
   b) at least one relatively high-molecular-weight compound containing at least two reactive hydrogen atoms, and, if desired,
   c) a low-molecular-weight chain extender and/or cross-linking agent,
in the presence of
   d) a blowing agent
   e) a catalyst and
   f) assistants and/or additives,
wherein the blowing agent (d) used is a mixture which contains
   d1) at least one low-boiling, fluorinated or perfluorinated tertiary alkylamine, and
   d2) at least one physical or chemical blowing agent which is different from (d1).

7. A process as claimed in claim 6, wherein the physical blowing agent (d2) is selected from the group comprising
   alkanes having 4 to 12 carbon atoms,
   cycloalkanes having 4 to 6 carbon atoms,
   linear or cyclic ethers having 2 to 5 carbon atoms,
   aliphatic carboxylic acid esters having a maximum boiling point of 142° C.,
   aliphatic or cycloaliphatic ketones having 3 to 5 carbon atoms,
   partially halogenated chlorofluorocarbons having 1 or 2 carbon atoms,
   perfluorinated, linear or cyclic ethers having 4 to 12 carbon atoms, and
   fluorinated or perfluorinated hydrocarbons having 3 to 8 carbon atoms.

8. A process as claimed in claim 6, wherein the physical blowing agent (d2) is selected from the group comprising fluorinated hydrocarbons having 3 to 6 carbon atoms and containing at least one bonded hydrogen atom, and perfluorinated hydrocarbons having 4 to 7 carbon atoms, and mixtures thereof.

9. A process as claimed in claim 6, wherein the blowing agent mixture (d) contains the fluorinated or perfluorinated, tertiary alkylamine (d1) and the physical blowing agent (d2) which is different from (d1) in a weight ratio of 90:10 to 10:90.

10. A process as claimed in claim 6, wherein the blowing agent mixture (d) comprising (d1) and the physical blowing agent (d2) which is different from (d1) is emulsified in at least one of starting components (a), (b) and (c).

11. A process as claimed in claim 6, wherein the chemical blowing agent is selected from the group comprising water, formic acid, organic mono- and polycarboxylic acids having a molecular weight of from 60 to 300, ammonium salts and amine salts of formic acid or organic mono- or polycarboxylic acids having a molecular weight of from 60 to 300, and mixtures of at least two of these chemical blowing agents.

12. A process as claimed in claim 6, wherein the blowing agent mixture (d) contains, based on the total weight of (d1) and (d2), d1) at least 30 % by weight of at least one low-boiling, fluorinated or perfluorinated, tertiary alkylamine, and d2) a maximum of 70% by weight of at least one further physical or chemical blowing agent which is different from (d1).

13. A process as claimed in claim 6, wherein the blowing agent (d) comprising (d1) and (d2) is used in an amount from 1 to 40 parts by weight, based on 100 parts by weight of the starting components (a) to (c) or (a) and (b).

* * * * *